(12) United States Patent
Fontaine et al.

(10) Patent No.: US 12,531,253 B1
(45) Date of Patent: Jan. 20, 2026

(54) AIR-COOLED FUEL CELL STACKS INTEGRATED INTO AIRCRAFT WINGS

(71) Applicant: ZeroAvia, Inc., Hollister, CA (US)

(72) Inventors: Jonathan Leopold Nutzati Fontaine, Hollister, CA (US); Jose Rodrigues, Hollister, CA (US); Bradley Clark Riordan, Hollister, CA (US); Valery Miftakhov, Hollister, CA (US)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 18/778,797

(22) Filed: Jul. 19, 2024

(51) Int. Cl.
| | |
|---|---|
| *H01M 8/04014* | (2016.01) |
| *B64D 27/31* | (2024.01) |
| *B64D 27/355* | (2024.01) |
| *B64D 33/08* | (2006.01) |
| *H01M 8/04007* | (2016.01) |
| *H01M 8/04029* | (2016.01) |
| *H01M 8/04082* | (2016.01) |
| *H01M 8/10* | (2016.01) |

(52) U.S. Cl.
CPC ........ *H01M 8/04014* (2013.01); *B64D 27/31* (2024.01); *B64D 27/355* (2024.01); *B64D 33/08* (2013.01); *H01M 8/04029* (2013.01); *H01M 8/04067* (2013.01); *H01M 8/04201* (2013.01); *H01M 2008/1095* (2013.01); *H01M 2250/20* (2013.01)

(58) Field of Classification Search
CPC ...... B64D 27/31; B64D 27/355; B64D 33/08; B64D 15/02; B64D 15/04; B64D 15/06; B64D 15/08; B64D 2013/0607; H01M 8/04007; H01M 8/04; H01M 8/014; H01M 8/04029; H01M 8/04067

USPC .......................................................... 244/55
See application file for complete search history.

(56) References Cited

U.S. PATENT DOCUMENTS

| | | | | |
|---|---|---|---|---|
| 2,514,105 | A * | 7/1950 | Thomas | B64D 15/02 |
| | | | | 165/44 |
| 3,987,984 | A * | 10/1976 | Fischer | B64C 3/46 |
| | | | | 244/219 |
| 6,568,633 | B2 | 5/2003 | Dunn | |
| 10,293,945 | B2 | 5/2019 | Hoffjann et al. | |
| 10,457,391 | B2 * | 10/2019 | Keegan | B64C 3/26 |
| 10,759,539 | B2 | 9/2020 | Knapp et al. | |
| 11,459,087 | B2 * | 10/2022 | Erban | B64C 3/26 |
| 11,876,263 | B1 * | 1/2024 | Wang | B64D 33/10 |
| 12,030,655 | B2 * | 7/2024 | Zagrodnik | B64C 29/0033 |
| 12,199,305 | B2 * | 1/2025 | Villanueva | H01M 50/249 |
| 2013/0199218 | A1 | 8/2013 | Scheibert | |
| 2015/0232191 | A1 * | 8/2015 | Wetzel | H01M 10/6563 |
| | | | | 62/61 |

(Continued)

FOREIGN PATENT DOCUMENTS

| | | |
|---|---|---|
| WO | WO2013140306 A1 | 9/2013 |
| WO | WO2021231649 A1 | 11/2021 |

(Continued)

OTHER PUBLICATIONS

U.S. Appl. No. 18/465,875, filed Sep. 12, 2023, Miftakhov et al.

(Continued)

*Primary Examiner* — Joshua E Rodden
(74) *Attorney, Agent, or Firm* — HAYES SOLOWAY P.C.

(57) ABSTRACT

A fuel-cell-powered aircraft system has integrated air-cooled fuel cell stacks positioned within an interior space of at least one wing of an aircraft. An airflow path is positioned in contact with at least a heat exchanger of the fuel cell stack. The induced flow of air through the airflow path cools the heat exchanger. The efficiently-induced flow of air for cooling the fuel cell stack has a zero or minimal drag penalty.

20 Claims, 10 Drawing Sheets

(56) References Cited

U.S. PATENT DOCUMENTS

| | | | |
|---|---|---|---|
| 2019/0002078 A1* | 1/2019 | Parham, Jr. | B64C 1/12 |
| 2019/0165408 A1* | 5/2019 | Andryukov | H01M 10/0468 |
| 2019/0382130 A1* | 12/2019 | Bar Yohai | B64C 1/38 |
| 2020/0140103 A1 | 5/2020 | Halverson | |
| 2021/0024221 A1* | 1/2021 | Huet | B64D 15/04 |
| 2021/0053689 A1* | 2/2021 | Lynn | B60L 3/0092 |
| 2021/0155350 A1* | 5/2021 | Kwon | B64C 27/16 |
| 2022/0402622 A1* | 12/2022 | Villanueva | B64D 29/00 |
| 2023/0382552 A1 | 11/2023 | Wang et al. | |
| 2024/0025551 A1* | 1/2024 | Chang | B64D 37/30 |
| 2024/0043132 A1* | 2/2024 | Law | B64D 33/10 |
| 2024/0217669 A1* | 7/2024 | Mikic | H01M 8/04067 |
| 2024/0222668 A1 | 7/2024 | Lynn et al. | |

FOREIGN PATENT DOCUMENTS

| | | | |
|---|---|---|---|
| WO | WO2022074040 A1 | 4/2022 | |
| WO | WO2023198547 A1 | 10/2023 | |
| WO | 2023209316 A1 | 11/2023 | |

OTHER PUBLICATIONS

Brodmann, et al., Modular Fuel Cell System, 18th World Hydrogen Energy Conference 2010—WHEC 2010, https://juser.fz-juelich.de/record/135328/files/FC2_pp_1_Greda_rev0607.pdf, 5 pgs.

Li, Bowen, Qiangqiang Sun, Dandan Xiao, and Wenqiang Zhang. 2022. "Numerical Investigation of the Aerofoil Aerodynamics with Surface Heating for Anti-Icing" Aerospace 9, No. 7: 338. https://doi.org/10.3390/aerospace9070338.

Raceanu, Mircea & Bizon, Nicu & Varlam, Mihai. (2022). Experimental Results for an Off-Road Vehicle Powered by a Modular Fuel Cell Systems Using an Innovative Startup Sequence. Energies. 15. 8922. 10.3390/en15238922.

Hoerner, "Fluid-Dynamic Drag, theoretical, experimental and statistical information", Chapter IX, published by Dr. Sighard F. Hoerner, Great Britain, 1965, 22 pgs.

* cited by examiner

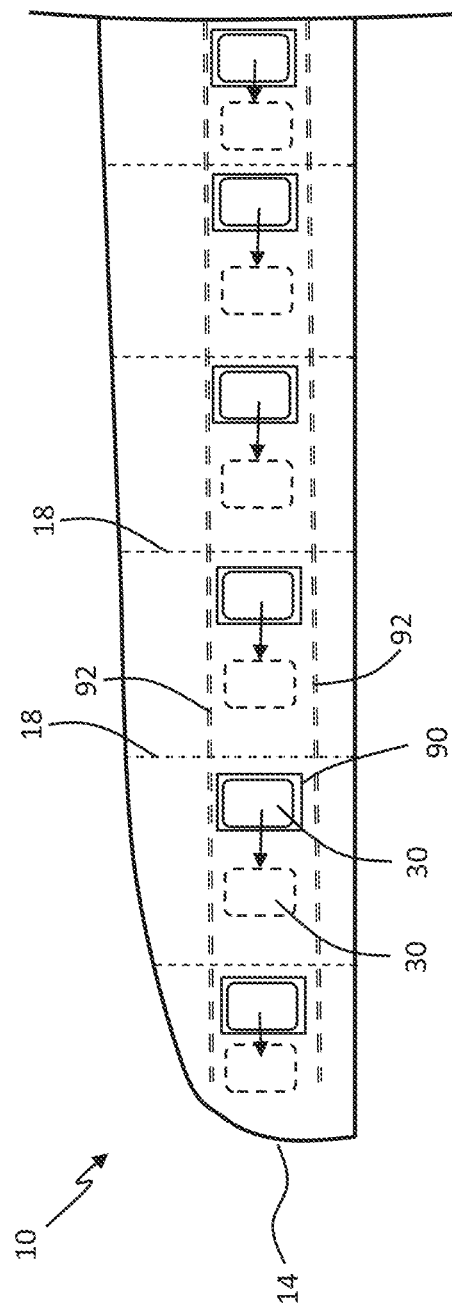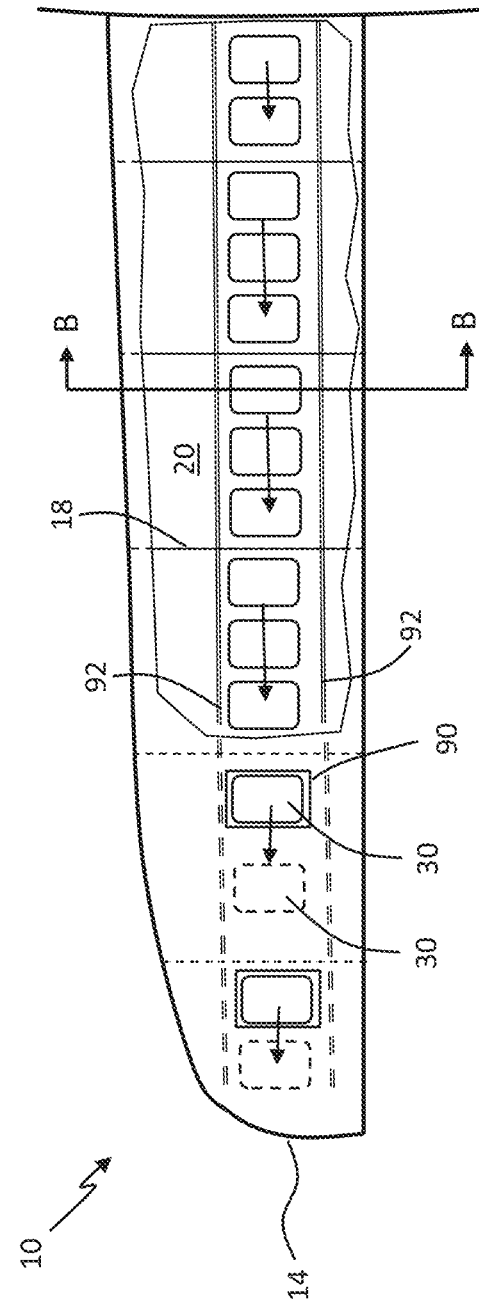

AIR-COOLED FUEL CELL STACKS INTEGRATED INTO AIRCRAFT WINGS

TECHNICAL FIELD

The present disclosure relates to hydrogen fuel cell electric engine systems for use with aircraft and will be described in connection with such utility, although other utilities are contemplated.

BACKGROUND AND SUMMARY

This section provides background information related to the present disclosure which is not necessarily prior art. This section provides a general summary of the disclosure and is not a comprehensive disclosure of its full scope or all its features.

Exhaust emissions from transport vehicles are a significant contributor to climate change. Conventional fossil-fuel-powered aircraft engines release $CO_2$ emissions. Also, fossil-fuel-powered aircraft emissions include non-$CO_2$ effects due to nitrogen oxide (NOx), vapor trails, and cloud formation triggered by the altitude at which aircraft operate. These non-$CO_2$ effects are believed to contribute twice as much to global warming as aircraft $CO_2$ and are estimated to be responsible for two-thirds of aviation's climate impact. Additionally, the high-speed exhaust gasses of conventional fossil-fuel-powered aircraft engines contribute significantly to the extremely large noise footprint of commercial and military aircraft, particularly in densely populated areas.

Rechargeable battery-powered terrestrial vehicles, i.e., "EVs", are slowly replacing conventional fossil-fuel-powered terrestrial vehicles. However, the weight of batteries and limited energy storage of batteries makes rechargeable battery-powered aircraft generally impractical.

Hydrogen fuel cells offer an attractive alternative to fossil-fuel-burning engines. Hydrogen fuel cell tanks may be quickly filled and store significant energy, and other than the relatively small amount of unreacted hydrogen gas, the reaction output exhausted from hydrogen fuel cells comprises essentially only water.

A hydrogen fuel cell is an electrochemical cell that converts chemical energy into electrical energy by spontaneous electrochemical reduction-oxidation (redox) reactions. Fuel cells include an anode and a cathode separated by a proton exchange membrane (PEM) that permits only protons to pass between the anode and cathode. During operation, a fuel (e.g., hydrogen) is supplied to the anode, and an oxidant (e.g., oxygen or air) is supplied to the cathode. The fuel is oxidized at the anode, producing positively charged ions (i.e., hydrogen protons) and electrons. The positively charged protons travel through the PEM from the anode to the cathode, while the electrons simultaneously travel from the anode to the cathode outside the cell via an external circuit, which produces an electric current. The oxidant supplied to the cathode is reduced by the electrons arriving from the external circuit and combines with the positively charged ions to form water. The reaction between oxygen and hydrogen is exothermic, generating heat that needs to be removed from the fuel cell.

Hydrogen fuel cells may be used as power sources for electric motors of electric vehicles and hybrid electric vehicles, including aircraft. In such applications, fuel cells are oftentimes arranged in stacks of multiple cells and connected in a series or parallel arrangement to achieve a desired power and output voltage. Cooling systems for hydrogen fuel-cell-powered vehicles oftentimes use airflow generated during movement of the vehicle as a heat transfer medium. For example, ambient airflow may be directed from outside the vehicle through an air intake of the vehicle and through one or more heat exchangers disposed within the vehicle. Airflow generated in this manner is oftentimes referred to as ram air, and, when ram air is used as a cooling medium in a vehicle, the vehicle may experience increased drag, which may reduce the energy efficiency of the vehicle.

Wing nacelle-mounted fuel cell engines, typically consisting of fuel cell stacks, motor, control electronics, and other components, can be used to position the fuel cell in a direct path of ambient airflow. However, these nacelle-mounted full cells place excessive stress on the wing structure due to their concentrated weight at specific locations along the span of the wing, and due to the additional parasite drag. Additionally, even in this position, there is generally insufficient cooling airflow for the fuel cell stacks without significant increases in frontal area or other contributors to parasite drag.

An improvement to cooling fuel cell stacks can be realized by positioning the fuel cell stacks into the interior space of the wing of an aircraft, which, in non-hydrocarbon-fueled aircraft is a particularly unutilized volume within the wing structure, such that the fuel cell stacks and wing form an integrated component. This combination leverages mutual requirements from the wing and the fuel cell stack of a high surface area and a pressure differential. Airflow can be directed to a heat exchanger of the fuel cell stacks with the use of ducting, such as ducting which has strategically located inlets and outlets that minimize drag increases. For example, the inlet can be located on a bottom of the wing along a leading edge and an outlet can be located along the top of the wing near a trailing edge. Airflow into the ducting can be controlled using a door, a membrane, or a component of the wing itself, such as a wing slat or a wing flap.

An additional benefit of locating the fuel cell stacks within the wing structure is achieving a balanced distribution of weight inside the wing and along the wingspan. This distribution helps prevent excess stress from being placed at specific points along the wing structure.

Embodiments of the present disclosure provide a fuel-cell-powered aircraft system. Briefly described, in architecture, one embodiment of the system, among others, can be implemented as follows. At least one fuel cell stack is positioned within an interior space of at least one wing of an aircraft. An airflow path is positioned in contact with at least a heat exchanger of the fuel cell stack, wherein induced flow of air through the airflow path cools the heat exchanger.

In one aspect, the system uses ducting for directing a position of the airflow path, wherein the airflow path has an inlet positioned along a leading edge of the wing and an outlet positioned along a trailing edge of the wing.

In this aspect, the inlet is positioned along a bottom surface of the leading edge of the wing, and the outlet is positioned along an upper surface of the trailing edge of the wing.

In this aspect, at least one of the inlet or outlet is openable and closable using at least one of: a door, a wing slat, or a wing flap.

In this aspect, the ducting at the outlet is convergent towards the trailing edge of the wing.

In this aspect, a membrane is positioned at the inlet and outlet of the airflow path, wherein the membrane controls the flow of air through the inlet and the outlet.

Still further in this aspect, at least one fan is positioned proximate to the inlet at the leading edge of the wing, wherein the fan induces the flow of air through the airflow path to cool the heat exchanger.

Further, in this aspect, the at least one fuel cell stack which is positioned within the interior space of the wing further comprises a plurality of fuel cell stacks and the inlet is positioned within a propeller wash. The system further includes a diffuser connected to the inlet at the leading edge of the wing, where the diffuser receives a portion of air from the propeller wash and directing the portion of the air to the plurality of fuel cell stacks.

In another aspect, the at least one fuel cell stack is positioned within the interior space of the wing further comprises a plurality of fuel cell stacks, each positioned within the interior space of the wing in a location between a rear spar, a front spar, and at least one rib.

In yet another aspect, at least one plenum pipe is positioned along at least a portion of a wingspan of the wing, the at least one plenum pipe transporting at least one of: pressurized air and hydrogen for use in high temperature proton exchange membranes (HTPEMs) or coolant for use in low temperature proton exchange membranes (LTPEMs).

In this aspect, the at least one plenum pipe is formed by a front spar of the wing.

In yet another aspect, the system further comprises a supplemental air pipe positioned along at least a portion of a wingspan of the wing, wherein airflow is provided to the heat exchanger of the fuel cell stack from the supplemental air pipe.

In another aspect, the system further comprises a rail positioned within the interior space of the wing along at least a portion of a wingspan of the wing, wherein the fuel cell stack is movably mounted to the rail.

In this aspect, at least one access opening may be formed in a skin of the wing, wherein the fuel cell stack is insertable through the access opening and into the interior space of the wing at a first position, and wherein the fuel cell stack is movable along the rail to a second position.

In yet another aspect, the heat exchanger of the fuel cell stack is positioned within a skin of the wing, wherein the airflow path is positioned exterior of the wing and in contact with the skin of the wing to cool the heat exchanger.

The present disclosure can also be viewed as providing a fuel-cell-powered aircraft system. Briefly described, in architecture, one embodiment of the system, among others, can be implemented as follows. A plurality of fuel cell stacks is positioned within an interior space of at least one wing of a fuel-cell-powered aircraft. The interior space is formed in a location between a rear spar, a front spar, and at least one rib of the wing. At least one airflow path is formed between an inlet and outlet located on the wing, and positioned in contact with a heat exchanger of each of the fuel cell stacks in the interior space. When a flow of air is induced through the airflow path, the flow of air cools the heat exchanger.

The present disclosure can also be viewed as providing methods of cooling a fuel cell stack of a fuel-cell-powered aircraft. In this regard, one embodiment of such a method, among others, can be broadly summarized by the following steps: inducing a flow of air through an airflow path formed through a wing of the aircraft; and contacting a heat exchanger of a fuel cell stack positioned within an interior space of the wing of the aircraft, whereby the induced flow of air through the airflow path cools the heat exchanger.

In this aspect, the method further comprising controlling the flow of air through the airflow path with at least one of a door, a membrane, a wing slat, or a wing flap positionable over an inlet of the airflow path positioned along a leading edge of the wing or an outlet of the airflow path positioned along a trailing edge of the wing.

In another aspect, the flow of air through the airflow path is induced by at least one of: a freestream flow, a propeller wash, at least one fan positioned proximate to an inlet of the airflow path, or a supplemental air pipe positioned along at least a portion of a wingspan of the wing.

In yet another aspect, contacting the heat exchanger of the fuel cell stack positioned within the interior space of the wing of the aircraft further comprises: contacting a heat exchanger of each of a plurality of fuel cell stacks, each positioned within the interior space of the wing of the aircraft in a location between a rear spar, a front spar, and at least one rib.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings:

FIG. 9A is a top view diagrammatical illustration of the fuel-cell-powered aircraft system having air-cooled fuel cell stacks integrated into wings of an aircraft, and using a rail system, in accordance with the present disclosure;

FIG. 9B is a top view diagrammatical illustration of the fuel-cell-powered aircraft system having air-cooled fuel cell stacks integrated into wings of an aircraft, and using a rail system of FIG. 9A, showing a cutaway view through the wing, in accordance with the present disclosure;

DETAILED DESCRIPTION

Figure 1:
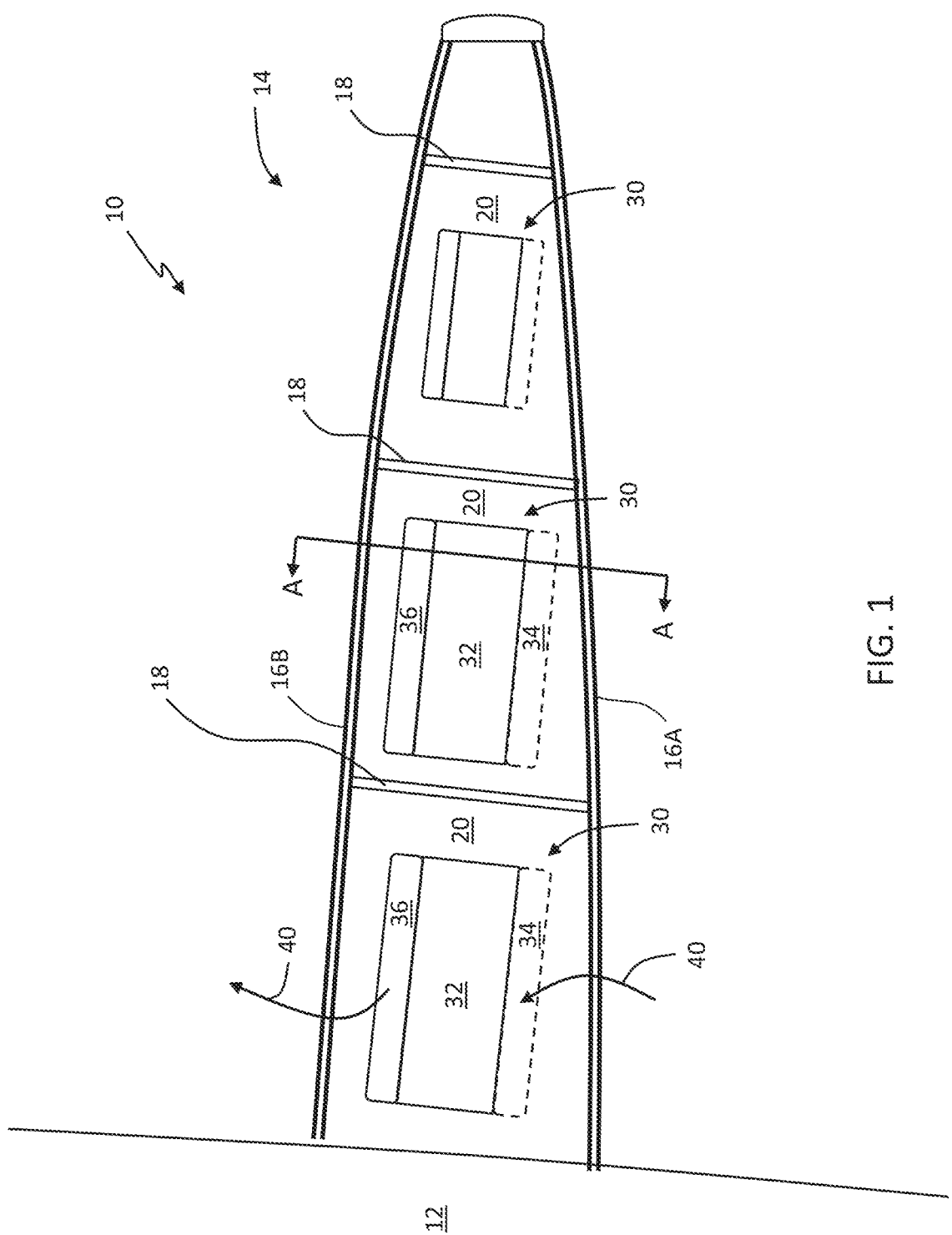
FIG. 1 is a top view diagrammatical illustration of a fuel-cell-powered aircraft system having air-cooled fuel cell stacks integrated into wings of an aircraft, in accordance with the present disclosure.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 is a top view diagrammatical illustration of a fuel-cell-powered aircraft system 10 (hereinafter, 'system') having air-cooled fuel cell stacks integrated into wings of an aircraft, in accordance with the present disclosure. As shown, the system 10 is used with an aircraft having a fuselage 12 and at least one wing 14. The aircraft is a fuel-cell-powered aircraft which uses energy stored in one or more fuel cells for aircraft operation. Wing 14 includes a leading edge spar 16A which is positioned along a forward edge of wing 14, and a trailing edge spar 16B positioned along a rear edge of wing 14, where leading edge spar 16A and trailing edge spar 16B are positioned along a length of the wingspan of wing 14. Ribs 18 are positioned substantially perpendicular to leading edge spar 16A and trailing edge spar 16B, and interconnected therebetween, to form the framework of wing 14. Ribs 18 are positioned at intervals along the wingspan of wing 14, such that an interior space 20 is formed in an interior of wing 14 in a location between leading edge spar 16A, trailing edge spar 16B, and at least one rib 18. Wing 14 may further include any other components or structure which are commonly used in aircraft.

At least one fuel cell stack 30 is positioned within the interior space 20 of wing 14, but it may be common for a plurality of fuel cell stacks 30 to be included in a wing 14, where one or more fuel cell stacks 30 is positioned in each interior space 20 formed within the structure of wing 14. Combining the wing 14 and fuel cell stacks 30 into an integrated component leverages mutual requirements of high surface area and a pressure differential. Fuel cell stacks 30 are heavy. As shown in FIG. 1, the fuel cell stacks 30 are distributed along the wingspan of wing 14, such that they are adequately packaged inside the unutilized volume in the wing structure. Instead of a point load on the wing structure, which is typical for nacelle-mounted components, the distribution of the fuel cell stacks 30 in the wing structure provides a more evenly distributed load on the wing structure, and subsequently lower stresses. Additionally, the interior positioning of the fuel cell stacks 30 minimizes increases in frontal area of the wing 14, while still providing the full cell stacks 30 with airflow through the use of strategically located inlets and outlets that minimize drag increases on the aircraft.

Figure 2:
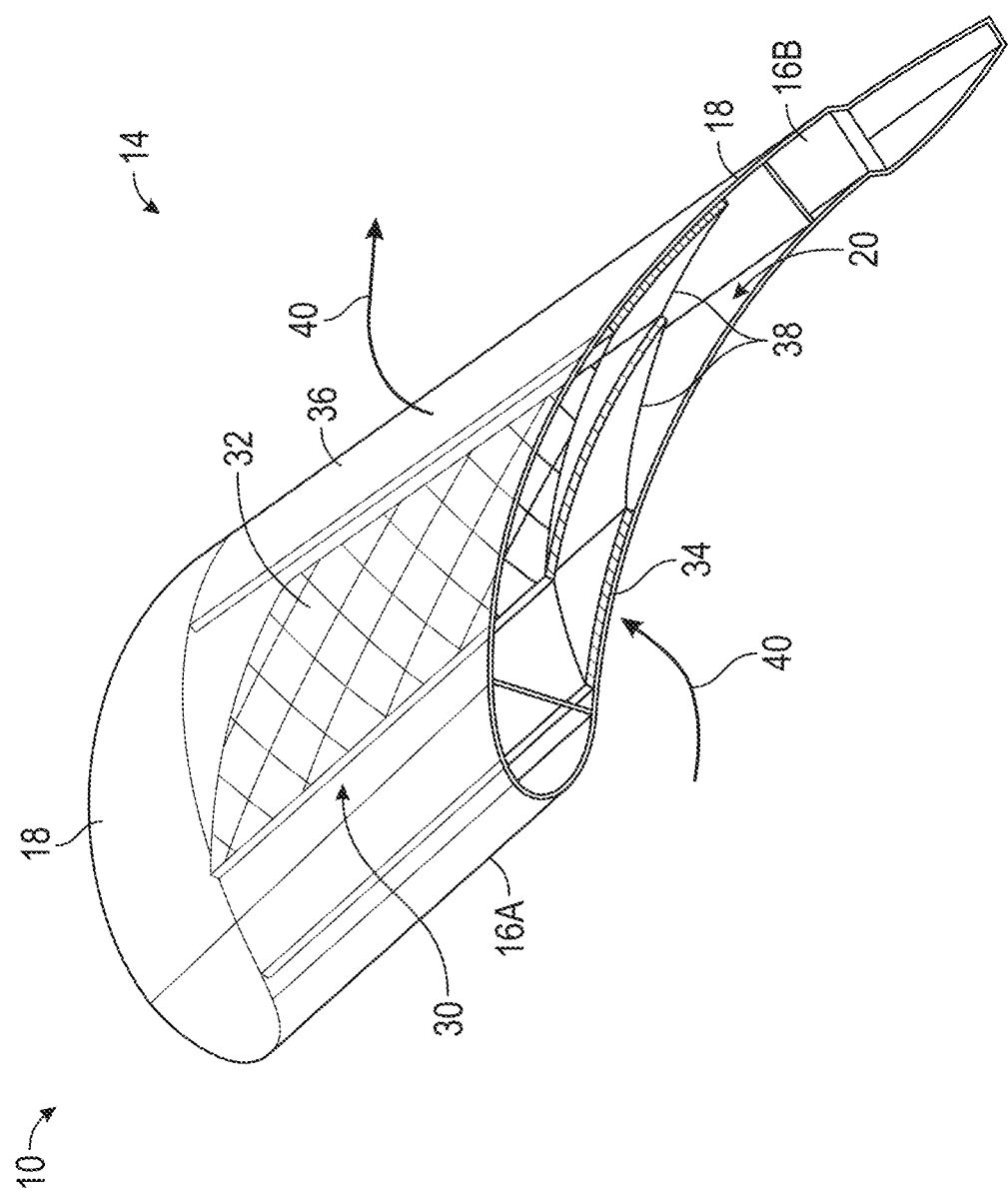
FIG. 2 is an elevated, side view diagrammatical illustration of the fuel-cell-powered aircraft system having air-cooled fuel cell stacks integrated into wings of an aircraft of FIG. 1, in accordance with the present disclosure.
Figure 3:
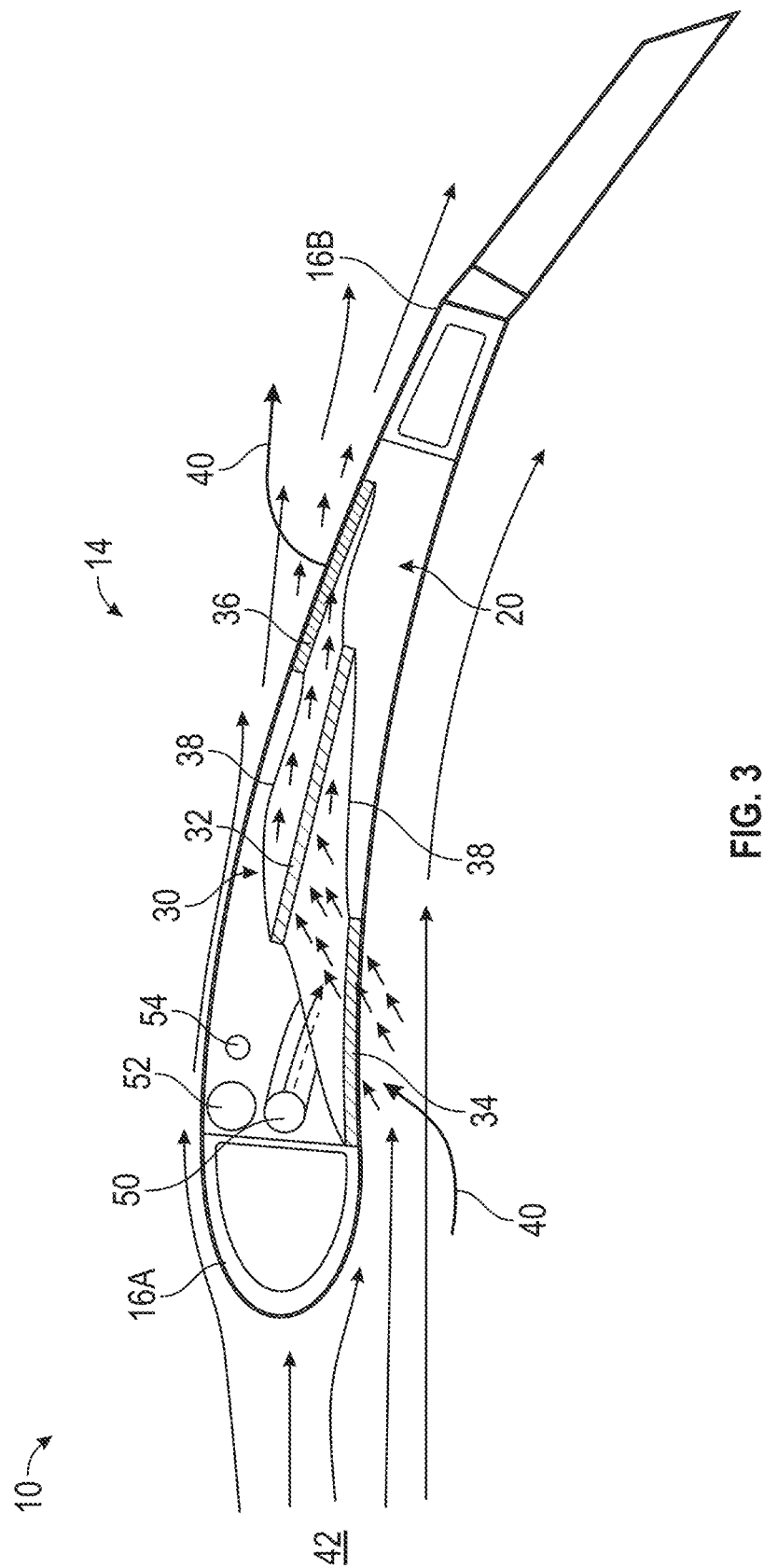
FIG. 3 is a cross-sectional side view diagrammatical illustration of the fuel-cell-powered aircraft system having air-cooled fuel cell stacks integrated into wings of an aircraft of FIG. 1, taken along the line A-A, in accordance with the present disclosure.

Fuel cell stacks 30 require large quantities of cooling airflow for successful operation. The flow of air is induced to move along an airflow path 40 (indicated by arrows) which is in contact with a heat exchanger 32 of the fuel cell stack 30, where the flow of air directly or indirectly contacts the heat exchanger 32. The airflow path 40 may vary, as may be dependent on design and operational parameters, and one example of the airflow path 40 is depicted in greater detail relative to FIGS. 2-3. FIG. 2 is an elevated, side view diagrammatical illustration, and FIG. 3 is a cross-sectional side view diagrammatical illustration of the fuel-cell-powered aircraft system having air-cooled fuel cell stacks 30 integrated into wings 14 of an aircraft of FIG. 1, in accordance with the present disclosure. With reference to FIGS. 1-3 together, airflow path 40 is supplied air from a freestream flow 42 present when the aircraft is moving, or a flow of air which is supplemented to the airflow path 40, as discussed relative to FIGS. 3 and 6-7. Along a forward edge of wing 14, air enters one or more inlets 34 which is positioned on a leading side of heat exchanger 32 of fuel cell stack 30. The air is passed through or by heat exchanger 32 and is expelled through one or more outlets 36, positioned on an opposing side of heat exchanger 32 from the inlet 34, along a trailing edge thereof. When the air is supplied by the freestream flow 42, a portion of the freestream flow 42 moves above and below the wing 14, as depicted in FIG. 3.

One or more ducting 38 structures is used to form the boundaries of airflow path 40 within the wing structure. Ducting 38 may be formed from any suitable material, such as aluminum sheeting or carbon fiber panels which are formed to direct air along a desired path. The ducting 38 connects the inlet 34 to the heat exchanger 32, which may be positioned on or at the skin of wing 14. Ducting 38 expands with an increasing cross-sectional area between the inlet 34 and the heat exchanger 32, thereby supplying the surface area of the heat exchanger 32 with a large volume of air. The ducting 38 is connected to the output side of the heat exchanger 32, where it may have a decreasing cross-sectional area between the heat exchanger 32 and the outlet 36. The outlet 36 may be positioned on or at the skin of the wing 14 near the trailing edge of the wing 14.

In an exemplary design, as shown in FIGS. 1-3, inlet 34 may be positioned along a bottom surface of the leading edge of wing 14, and outlet 36 is positioned along an upper surface of the trailing edge of wing 14. The natural pressure differential between the upper and lower surfaces of wing 14 may drive airflow through inlet 34 at the wing 14 bottom surface near the leading edge, through ducting 38 to and from the fuel cell stacks 30 with heat exchanger 32, and through air outlets 36 on the upper surface near the trailing edge of wing 14. As shown in FIGS. 2-3, ducting 38 may include an inlet ducting portion which is positioned angularly from inlet 34 at the leading edge of the bottom surface of wing 14 to a beginning of heat exchanger 32 positioned at a middle portion of wing 14. An outlet ducting portion of ducting 38 may be positioned angularly from the end of heat exchanger 32 to outlet 36.

The shape of ducting 38, inlet 34, or outlet 36, as well as the location of inlet 34 or outlet 36 may be designed to minimize negative impact on aircraft performance, or in some cases, to enhance aircraft performance. For example, inlet 34 may be designed to minimize drag increases on the aircraft, such as by placing inlet 34 along areas of wing 14 where air can enter airflow path 40 with minimal additional drag. Additionally, ducting 38 leading to outlet 36 may be designed to be convergent towards the trailing edge of wing 14, which may expand the warm exhaust air from outlet 36 into the wing's upper surface wake. This controlled expansion of the exhausted outlet air may reduce drag through the Meredith Effect.

In operation, forward movement of the aircraft will subject wing 14 to freestream flow 42, thereby inducing a flow of air within the airflow path 40. In situations where freestream flow 42 is not present, or is not present in a sufficient capacity to achieve the desired cooling effect, supplemental air may be provided in the airflow path 40. One or more supplemental air pipes 50, fed by a compressor or fan, may be positioned along the wingspan, or a portion thereof, in a location proximate to the front spar 16A, as shown in FIG. 3, or in another location, such as proximate to rear spar 16B. A compressor or fan may also supply supplemental airflow to the inlet 34 of ducting 38 to cool the fuel cell stacks 30 when there is low freestream flow, as discussed relative to FIGS. 6-7.

Additional pipes can be included to provide the fuel cell stacks 30 with other materials. For instance, as shown in FIG. 3, wing-internal plumbing may include one or more plenum pipes 52, 54 positioned along at least a portion of a wingspan of wing 14, such as along the front spar 16A and through ribs 18. Plenum pipe 52 may be a cathode air pipe which supplies pressurized air and plenum pipe 54 may supply hydrogen for use in high temperature proton exchange membranes (HTPEMs). When fuel cell stack 30 includes low temperature proton exchange membranes (LT-PEMs), plenum pipe 52 may supply a liquid coolant. These materials may circulate through a turbine or pump and the network of fuel cell stacks 30 within wing 14.

In addition to, or in place of, the supplemental air pipe 50, or plenum pipes 52, 54, it is also possible to utilize the interior space of the front spar 16A or rear spar 16B as a pipe for transporting air, hydrogen, coolant, or another material to the fuel cell stacks 30. For instance, the spars 16A, 16B may be formed as a fluid-proof structure which allows for a fluid or gas to be injected in the spar 16A, 16B at one location, such as proximate to the fuselage 12, and transported along the wingspan of wing 14 to fuel cell stacks 30. Utilizing the spar 16A, 16B for conveyance of materials may avoid or lessen the structural interference that supplemental air pipe 50, or plenum pipes 52, 54 face with ribs 18. Similarly, it may also be possible to use supplemental air pipe 50, or plenum pipes 52, 54, but in a location where one or more of them are installed within spar 16A, 16B, which may allow for less structural interference with ribs 18 yet prevent the need to form spar 16A, 16B as a fluid-proof structure.

Figure 4:
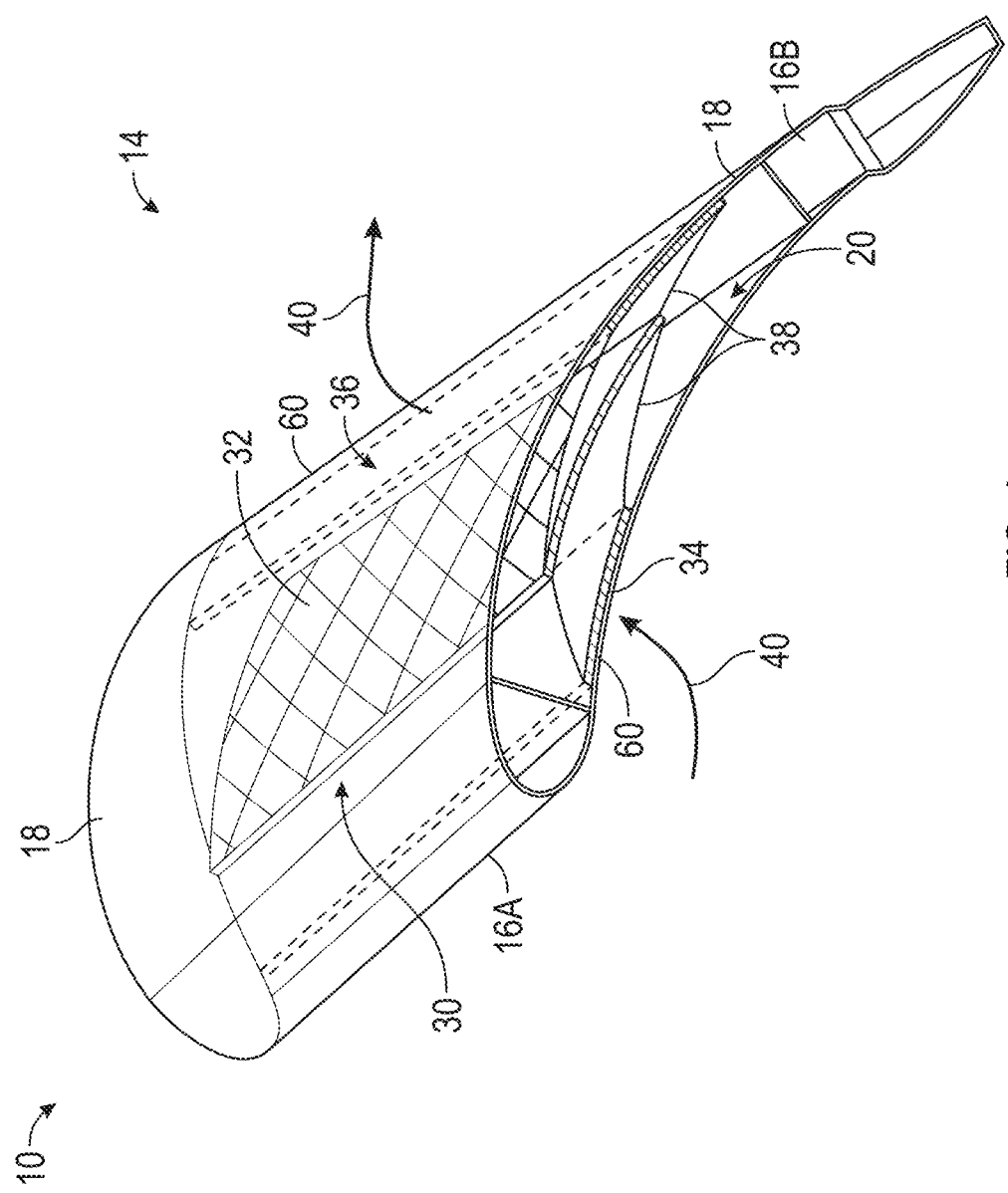
FIG. 4 is an elevated, side view diagrammatical illustration of the fuel-cell-powered aircraft system having air-cooled fuel cell stacks integrated into wings of an aircraft, and with membranes at an inlet and outlet of the airflow path ducting, in accordance with the present disclosure.

It may be beneficial to utilize additional components to prevent an increase in drag from the inlet 34 or outlet 36. To this end, FIG. 4 is an elevated, side view diagrammatical illustration of the fuel-cell-powered aircraft system having air-cooled fuel cell stacks 30 integrated into wings 14 of an aircraft, and with membranes 60 at an inlet 34 and outlet 36 of the airflow path 40 ducting 38, in accordance with the present disclosure. FIG. 4 depicts many of the same components as shown in FIG. 2, the descriptions of which are omitted from FIG. 4 for brevity in disclosure. As shown, a membrane 60 may be positioned at the inlet 34 and outlet 36 of the airflow path 40, wherein the membrane 60 controls the flow of air through the inlet 34 and the outlet 36. The membrane 60 may be a partially permeable membrane which has a porosity, such that membrane 60 can control a porosity of the wing 14 at the locations of the inlet 34 and outlet 36 to allow only a certain fraction of air from the freestream flow to enter ducting 38, thus controlling airflow into ducting 38 while reducing airflow interruption around the wing section.

The membrane 60 may be formed from various materials and have any desired structure. For example, the membrane may be a covering with angled holes, slots, or vents, which can direct a portion of air into ducting 38, or it may be a woven material which allows a percentage of air to pass through, or it may be another structure which achieves a desired porosity effect by other design. The membrane 60 may be located over the exposed opening of inlet 34 and outlet 36, as shown in FIG. 4, or it may cover only a portion of these openings. Membrane 60 may be positioned recessed relative to the skin of wing 14, such that the thickness of membrane 60 does not increase drag.

It is also possible to control the flow of air through the airflow path 40 through an inlet 34 or outlet 36 which is openable or closable. For instance, it may be possible to use a mechanical door or covering which is removably positionable over the inlet 34 or outlet 36 to control the entrance of air into ducting 38. In one example, inlet 34 or outlet 36 may be openable and closable using a door, such as an electromechanically activated door positioned over inlet 34 or outlet 36.

Figure 5:
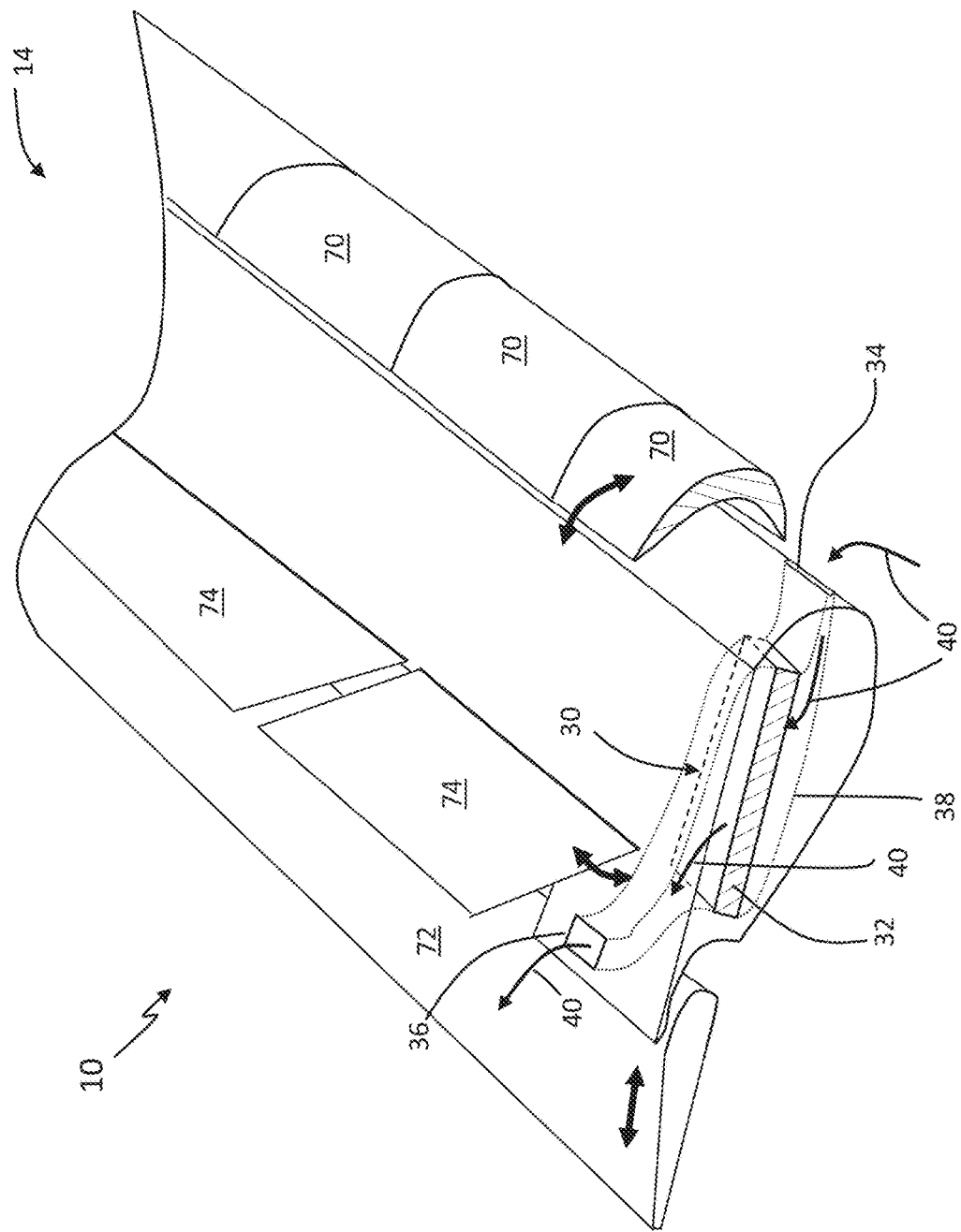
FIG. 5 is an elevated, cross-sectional, side view diagrammatical illustration of the fuel-cell-powered aircraft system having air-cooled fuel cell stacks integrated into wings of an aircraft, depicting a ducting inlet and outlet, in accordance with the present disclosure.

In another example, it may be possible to use a wing slat, a wing flap, or another structure of the wing 14 to cover the inlet 34 or outlet 36, as shown in FIG. 5, which is an elevated, cross-sectional, side view diagrammatical illustration of the fuel-cell-powered aircraft system having air-cooled fuel cell stacks 30 integrated into wings 14 of an aircraft, depicting ducting 38 with inlet 34 and outlet 36, in accordance with the present disclosure. As shown, the wing 14 includes one or more wing slats 70, wing flaps 72, or wing spoilers 74, where the inlet 34 or outlet 36 can be positioned in a location along the wing 14 where it can be removably covered by the slats 70, flaps 72, or spoilers 74 to control air along the airflow path 40 into ducting 38 which leads to heat exchanger 32 of the fuel cell stack 30. In this example, the inlets 34 and outlets 36 may be mechanically and actively partially opened or closed as required by the thermal system, or as an adjustment to the wing lift, drag or thrust, by integrating doors for the inlet 34 with wing slats 70, or integrating doors for outlet 36 with the wing flaps 72 or spoilers 74. This system may supplement or replace existing flaps or slats on the wing 14, or act as a similar pilot-controlled, flight-characteristic modifying device.

Figure 6:
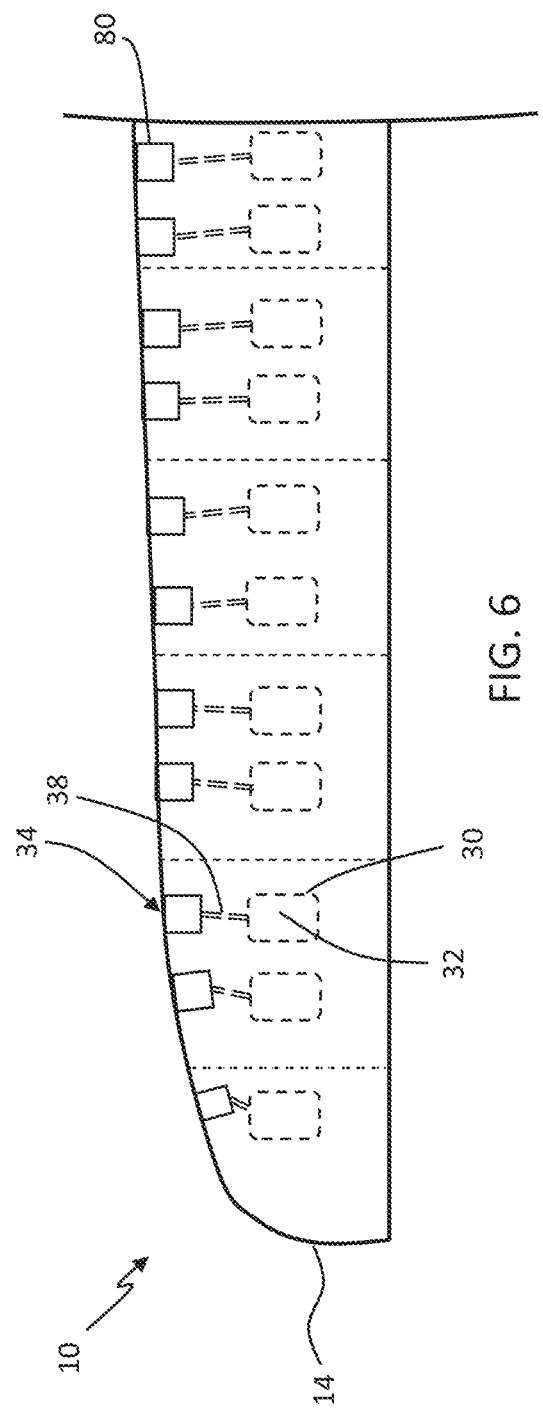
FIG. 6 is a top view diagrammatical illustration of a fuel-cell-powered aircraft system having air-cooled fuel cell stacks integrated into wings of an aircraft, and using fans for inducing airflow, in accordance with the present disclosure.

FIG. 6 is a top view diagrammatical illustration of a fuel-cell-powered aircraft system 10 having air-cooled fuel cell stacks 30 integrated into wings 14 of an aircraft, and using fans 80 for inducing airflow, in accordance with the present disclosure. As shown, it may be possible to use one or more fans 80 positioned proximate to the inlet 34 near the leading edge of the wing 14, in a location ahead of the fuel cell stack 30 and either internal or external to the wing interior space, to provide active cooling during low speed operations, such as during takeoff, taxiing, or other times when freestream flow is not available. The fan 80 induces the flow of air through ducting 38 to cool heat exchanger 32 of fuel cell stack 30. The fan 80 may be used in place of freestream flow of air, or as a supplement to it.

Figure 7:
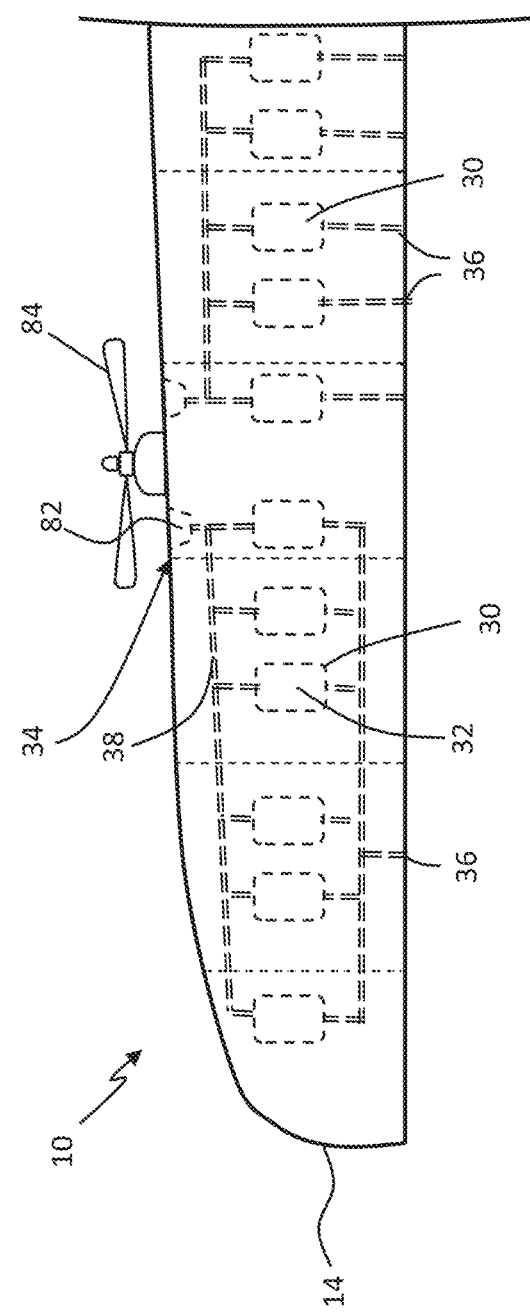
FIG. 7 is a top view diagrammatical illustration of a fuel-cell-powered aircraft system having air-cooled fuel cell stacks integrated into wings of an aircraft, and using propeller wash for inducing airflow, in accordance with the present disclosure.

In a similar design, it may be possible to utilize air from a propeller wash to provide active cooling or to provide supplemental airflow. As shown in FIG. 7, which is a top view diagrammatical illustration of a fuel-cell-powered aircraft system having air-cooled fuel cell stacks 30 integrated into wings 14 of an aircraft, and using propeller wash for inducing airflow, one or more diffusers 82 may be connected to the inlet 34 at the leading edge of the wing 14, where the diffuser 82 receives air from the propeller wash generated by propeller 84, and directs the air through the airflow path 40 to a plurality of fuel cell stacks 30. In this example, it may be possible to utilize a single inlet 34 on the wing 14 near the propeller wash, combined with a diffuser to bring air to multiple fuel cell stacks 30 further down the wing 14. It may also be possible to use a single outlet 36 to dispel the exhausted air, as shown on a portion of wing 14 in FIG. 7, or to have each fuel cell stack 30 have an individual outlet 36, as shown in another portion of wing 14 in FIG. 7. A benefit to using fewer inlets 34 and/or outlets 36 may be that flow is impacted only at one or two points along the wing 14, not the entire wing 14.

Figure 8:
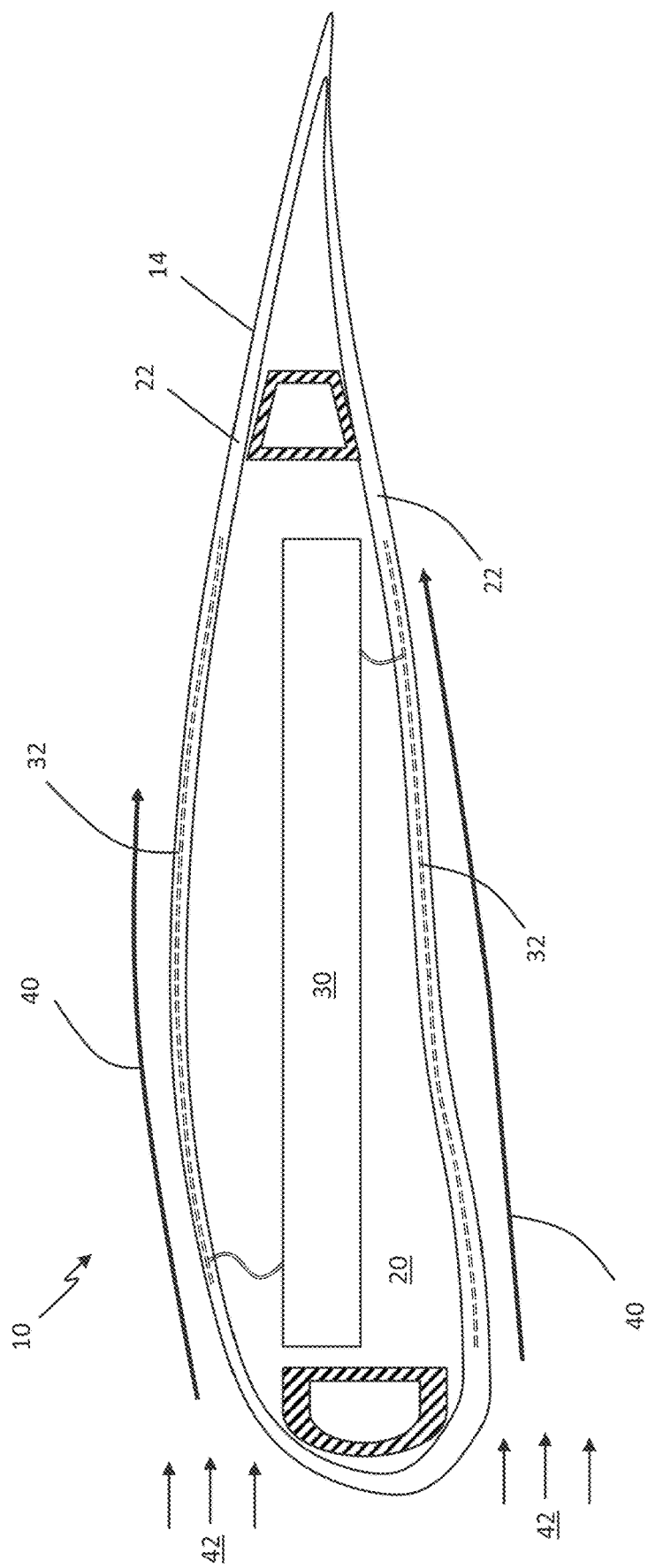
FIG. 8 is a side view diagrammatical illustration of the fuel-cell-powered aircraft system having air-cooled fuel cell stacks integrated into wings of an aircraft and using a heat exchanger positioned within the wing skin, in accordance with the present disclosure.

While FIGS. 1-7 are directed to an airflow path 40 which is positioned partially internal to the wing 14 structure, it may also be possible to use an airflow path 40 which is external to the wing 14. FIG. 8 is a side view diagrammatical illustration of the fuel-cell-powered aircraft system having air-cooled fuel cell stacks 30 integrated into wings 14 of an aircraft and using a heat exchanger 32 positioned within the wing skin 22. Rather than utilizing an air inlet 34, ducting 38, and outlet 36 (FIGS. 1-7), the fuel cell stacks 30 positioned within the interior space 20 of wing 14 may be connected to separate heat exchangers 32 which are embedded in the wing skin 22 itself and air-cooled by the freestream flow 42 of air along the external airflow path 40. In this example, the airflow path 40 positioned exterior of wing 14 contacts the skin 22 of wing 14 to cool the heat exchanger 32.

Due to the complexity of the wing 14 structure, it is desirable to have an efficient and accessible method of removing and installing fuel cell stacks 30 within the wing 14. Such a system is described relative to FIGS. 9A-9B, which are top view diagrammatical illustrations of the fuel-cell-powered aircraft system having air-cooled fuel cell stacks 30 integrated into wings 14 of an aircraft, and using a rail system. As shown in FIG. 9A, the wing 14 may include access openings 90 formed in a skin of the wing 14, where fuel cell stack 30 is insertable through the access opening 90 during installation of the fuel cell stack 30, such that it can be positioned within the interior space 20 of wing 14. FIG. 9B has a cutaway view which illustrates the interior of the wing 14 structure. When the fuel cell stack 30 is mounted to the rail 92, it may have a sliding or rolling interface with the wing 14, such that it is movable along a length of the rail 92, generally parallel with the wingspan. As such, it may be possible to reduce the size and/or number of openings in the skin of wing 14 required for installation and maintenance.

Figure 10:
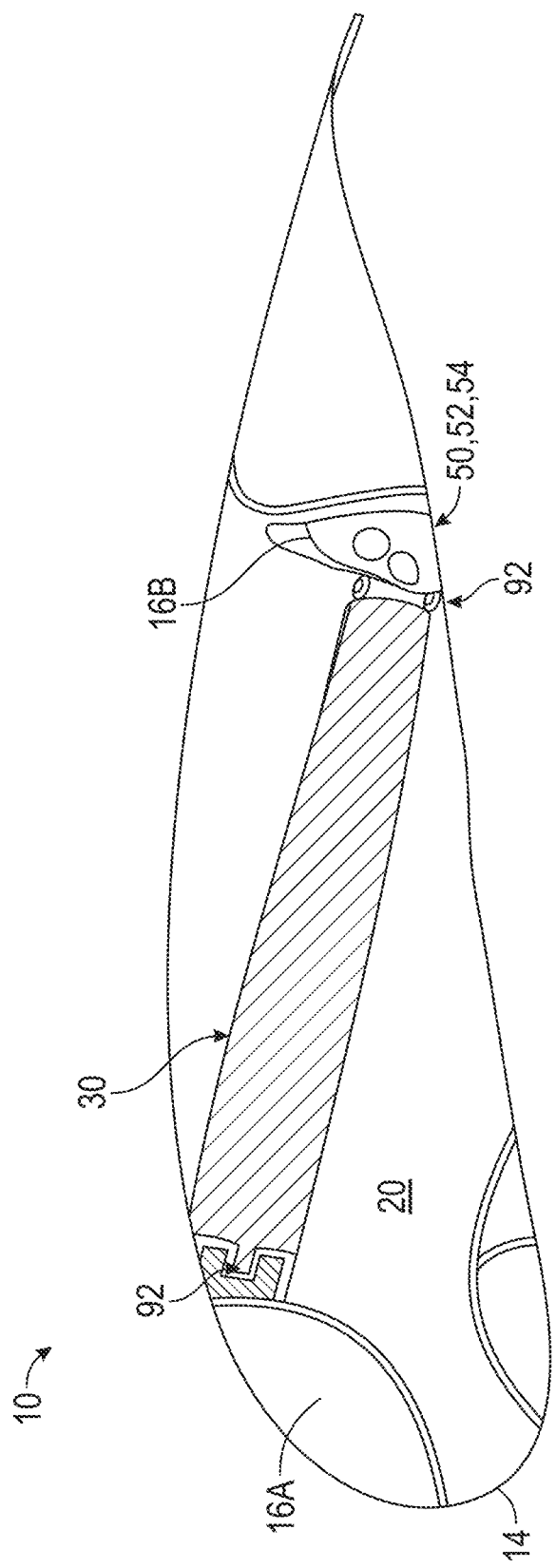
FIG. 10 is a side view diagrammatical illustration of the fuel-cell-powered aircraft system having air-cooled fuel cell stacks integrated into wings of an aircraft and using a rail system of FIGS. 9A-9B, taken along the line B-B of FIG. 9B, in accordance with the present disclosure.

In the example depicted, the rail may be positioned in wing 14 segments in between ribs 18, thereby allowing the fuel cell stack 30 to be moved within the interior portion 20 of the wing 14 between ribs 18. In use, the fuel cell stack 30 may be inserted through the access opening 90 and mounted to the rail 92 in a first position along the wingspan of wing 14, and then be moved to a different position along rail 92. The rail 92 may utilize any type of rail design or structures, such as those depicted in FIG. 10, which is a side view diagrammatical illustration of the fuel-cell-powered aircraft system having air-cooled fuel cell stacks 30 integrated into wings 14 of an aircraft and using a rail system of FIGS. 9A-9B, taken along the line B-B of FIG. 9B. For instance, the rail 92 may include a first section located towards a leading edge of wing 14, such as mounted to leading edge spar 16A, and a second section located near the trailing edge of wing 14, such as mounted to trailing spar 16B, such as in a location near supplemental pipe 50 and plenum pipes 52, 54. This design would allow all fuel cell stacks 30 to be installed through a single opening the size of one fuel cell stack 30, or a single opening for each bay of the wing 14 positioned between ribs 18. The corresponding fluidic connections to the fuel cell stacks 30 may also be modular units that allow for installation and service through smaller access points.

Figure 11:
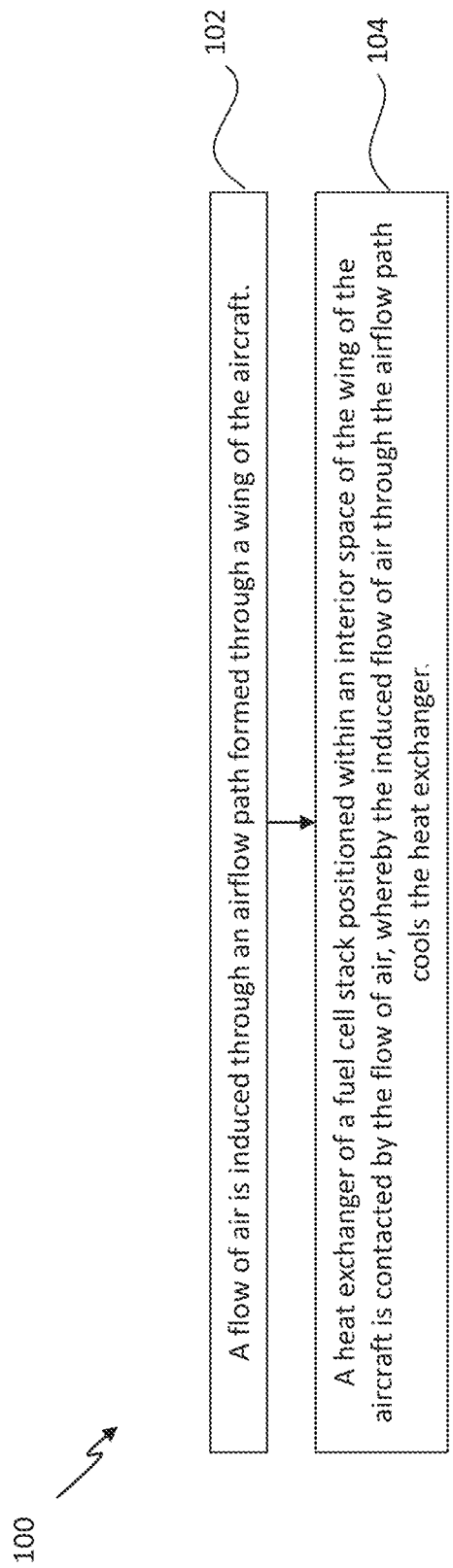
FIG. 11 is a flowchart illustrating a method of cooling a fuel cell stack of a fuel-cell-powered aircraft, in accordance with the present disclosure.

FIG. 11 is a flowchart illustrating a method of cooling a fuel cell stack of a fuel-cell-powered aircraft, in accordance with the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a flow of air is induced through an airflow path formed through a wing of the aircraft. A heat exchanger of a fuel cell stack positioned within an interior space of the wing of the aircraft is contacted by the flow of air, whereby the induced flow of air through the airflow path cools the heat exchanger (block 104).

Any number of additional steps, functions, processes, or variants thereof may be included in the method, including any disclosed relative to any other figure of this disclosure. For example, the flow of air through the airflow path may be controlled with at least one of a door, a membrane, a wing slat, or a wing flap positionable over an inlet of the airflow path positioned along a leading edge of the wing or an outlet of the airflow path positioned along a trailing edge of the wing. The flow of air through the airflow path may be induced by at least one of: a freestream flow, a propeller wash, at least one fan positioned proximate to an inlet of the airflow path, or a supplemental air pipe positioned along at least a portion of a wingspan of the wing. Contacting the heat exchanger of the fuel cell stack positioned within the interior space of the wing of the aircraft may further include contacting a heat exchanger of each of a plurality of fuel cell stacks, each positioned within the interior space of the wing of the aircraft in a location between a rear spar, a front spar, and at least one rib. Additional methods include configuring the fuel cell stack within a wing of the aircraft, whereby a user opens the access openings and inserts a fuel cell stack through the access opening to mount the fuel cell stack on a rail within the wing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

LIST OF REFERENCES 10 system
12 fuselage
14 wing
16A leading edge spar
16B trailing edge spar
18 rib
20 interior space
22 wing skin
30 fuel cell stack
32 heat exchanger
34 inlet
36 outlet
38 ducting
40 airflow path
42 freestream flow
50 supplemental air pipe
52, 54 plenum pipes
60 membrane
70 wing slats
72 wing flaps
74 wing spoilers
80 fan
82 diffuser
84 propeller
90 access opening
92 rail

What is claimed:

1. A fuel-cell-powered aircraft system comprising:
at least one fuel cell stack positioned within an interior space of at least one wing of an aircraft;
at least one plenum pipe formed by an interior space of a front spar of the at least one wing; and
an airflow path positioned in contact with at least a heat exchanger of the fuel cell stack, wherein induced flow of air through the airflow path cools the heat exchanger.

2. The system of claim 1, further comprising ducting directing a position of the airflow path, wherein the airflow path has an inlet positioned along a leading edge of the wing and an outlet positioned along a trailing edge of the wing.

3. The system of claim 2, wherein the inlet is positioned along a bottom surface of the leading edge of the wing, and the outlet is positioned along an upper surface of the trailing edge of the wing.

4. The system of claim 2, wherein at least one of the inlet or outlet is openable and closable using at least one of: a door, a wing slat, or a wing flap.

5. The system of claim 2, wherein the ducting at the outlet is convergent towards the trailing edge of the wing.

6. The system of claim 2, further comprising a membrane positioned at the inlet and outlet of the airflow path, wherein the membrane controls the flow of air through the inlet and the outlet.

7. The system of claim 2, further comprising at least one fan positioned proximate to the inlet at the leading edge of the wing, wherein the fan induces the flow of air through the airflow path to cool the heat exchanger.

8. The system of claim 2, wherein the at least one fuel cell stack positioned within the interior space of the wing further comprises a plurality of fuel cell stacks and the inlet is positioned within a propeller wash, and further comprising a diffuser connected to the inlet at the leading edge of the wing, the diffuser receiving a portion of air from the propeller wash and directing the portion of the air to the plurality of fuel cell stacks.

9. The system of claim 1, wherein the at least one fuel cell stack positioned within the interior space of the wing further comprises a plurality of fuel cell stacks, each positioned within the interior space of the wing in a location between a rear spar, the front spar, and at least one rib.

10. The system of claim 1, further comprising at least one plenum pipe positioned along at least a portion of a wingspan of the wing, the at least one plenum pipe transporting at least one of: pressurized air and hydrogen for use in high temperature proton exchange membranes (HTPEMs) or coolant for use in low temperature proton exchange membranes (LTPEMs).

11. The system of claim 1, further comprising a supplemental air pipe positioned along at least a portion of a wingspan of the wing, wherein airflow is provided to the heat exchanger of the fuel cell stack from the supplemental air pipe.

12. The system of claim 1, further comprising a rail positioned within the interior space of the wing along at least a portion of a wingspan of the wing, wherein the fuel cell stack is movably mounted to the rail.

13. The system of claim 12, further comprising at least one access opening formed in a skin of the wing, wherein the fuel cell stack is insertable through the access opening and into the interior space of the wing at a first position, and wherein the fuel cell stack is movable along the rail to a second position.

14. The system of claim 1, wherein the heat exchanger of the fuel cell stack is positioned within a skin of the wing, wherein the airflow path is positioned exterior of the wing and in contact with the skin of the wing to cool the heat exchanger.

15. A fuel-cell-powered aircraft system comprising:
a plurality of fuel cell stacks positioned within an interior space of at least one wing of a fuel-cell-powered aircraft, wherein the interior space is formed in a location between a rear spar, a front spar, and at least one rib of the wing;
at least one plenum pipe formed by an interior space of the front spar of the wing; and
at least one airflow path formed between an inlet and outlet located on the wing, and positioned in contact with a heat exchanger of each of the fuel cell stacks in the interior space, wherein an induced flow of air through the airflow path cools the heat exchanger.

16. A method of cooling at least one of the fuel cell stacks of the fuel-cell-powered aircraft as claimed in claim 15, the method comprising:
inducing a flow of air through the at least one plenum pipe formed by the interior space of the front spar of the wing of the aircraft; and
directing the flow of air from the plenum pipe to a heat exchanger of the at least one of the fuel cell stacks positioned within the interior space of the wing of the aircraft, whereby the flow of air through the heat exchanger cools the heat exchanger.

17. The method of claim 16, further comprising controlling the flow of air with at least one of a door, a membrane, a wing slat, or a wing flap positionable over an inlet of the airflow path positioned along a leading edge of the wing or an outlet of the airflow path positioned along a trailing edge of the wing.

18. The method of claim 16, wherein the flow of air is induced by at least one of: a freestream flow, a propeller wash, at least one fan positioned proximate to an inlet of the airflow path, or a supplemental air pipe positioned along at least a portion of a wingspan of the wing.

19. The method of claim 16, wherein contacting the heat exchanger of the fuel cell stack positioned within the interior space of the wing of the aircraft further comprises: contacting a heat exchanger of each of a plurality of fuel cell stacks, each positioned within the interior space of the wing of the aircraft in a location between a rear spar, the front spar, and at least one rib.

20. The system of claim 1, wherein the at least one fuel cell stack is positioned along an airflow path.

* * * * *